United States Patent
Froelicher et al.

(10) Patent No.: US 10,097,525 B2
(45) Date of Patent: Oct. 9, 2018

(54) SYSTEM, APPARATUS AND METHOD FOR GENERATING DYNAMIC IPV6 ADDRESSES FOR SECURE AUTHENTICATION

(71) Applicant: QUALCOMM Incorporated, San Diego, CA (US)

(72) Inventors: Jeffree Froelicher, San Diego, CA (US); Darrell Carbajal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 15/064,447

(22) Filed: Mar. 8, 2016

(65) Prior Publication Data

US 2017/0264600 A1 Sep. 14, 2017

(51) Int. Cl.
 *H04L 29/06* (2006.01)
 *H04L 29/12* (2006.01)
 *H04L 9/32* (2006.01)

(52) U.S. Cl.
 CPC .......... *H04L 63/062* (2013.01); *H04L 9/3268* (2013.01); *H04L 61/2092* (2013.01);
 (Continued)

(58) Field of Classification Search
 CPC ..... H04L 63/62; H04L 63/0823; H04L 63/10; H04L 9/3263; H04L 61/35; H04L 61/2092; H04L 61/6059; H04L 29/1232; H04L 29/12783; H04L 29/12915; H04L 63/062; H04L 9/3268; H04L 61/6004; H04L 61/6022
 See application file for complete search history.

(56) References Cited

U.S. PATENT DOCUMENTS 7,546,456 B2 6/2009 Le et al.
8,391,841 B2 3/2013 Semple et al.
(Continued)

FOREIGN PATENT DOCUMENTS

CN 104320259 A 1/2015

OTHER PUBLICATIONS

International Search Report and Written Opinion—PCT/US2017/019201—ISA/EPO—dated May 9, 2017.

*Primary Examiner* — Sarah Su
(74) *Attorney, Agent, or Firm* — James T. Hagler; Loza & Loza

(57) ABSTRACT

Apparatus, system and method for authenticating a device for secure network communication. Identification data is configured as a hash of a public key for identifying at least one of the device and/or a user associated with the device. An Internet Protocol (IP) message may be generated, wherein an IP source address in the IP message includes the identification data. The device may register with a server by transmitting the IP message and the public key and subsequently generate and transmit a second IP message, wherein an IP source address of the second IP message includes the identification data. The server may issue a challenge to the device in response to the second IP message, wherein the challenge is based at least in part on the identification data. After receiving the challenge, the device may transmit response data to the server for authenticating the device for secure network communication.

28 Claims, 12 Drawing Sheets

(52) U.S. Cl.
CPC ...... *H04L 61/6004* (2013.01); *H04L 61/6059* (2013.01); *H04L 63/0823* (2013.01); *H04L 63/10* (2013.01); *H04L 61/6022* (2013.01)

(56) References Cited

U.S. PATENT DOCUMENTS

| | | |
|---|---|---|
| 8,843,751 B2 | 9/2014 | Camarillo et al. |
| 2002/0133607 A1 | 9/2002 | Nikander |
| 2002/0152384 A1 | 10/2002 | Shelest et al. |
| 2004/0008845 A1* | 1/2004 | Le .................... H04L 29/12009 380/277 |
| 2004/0029584 A1* | 2/2004 | Le ........................ H04L 63/083 455/432.1 |
| 2009/0310602 A1* | 12/2009 | Olshansky .............. H04L 12/66 370/352 |
| 2010/0205443 A1* | 8/2010 | Zhao .................... H04L 9/0841 713/171 |
| 2011/0264908 A1* | 10/2011 | Feng .................... H04L 9/3247 713/153 |
| 2013/0097691 A1* | 4/2013 | Tanji .................. H04L 63/0236 726/13 |
| 2013/0337773 A1 | 12/2013 | Nozulak et al. |
| 2014/0241341 A1* | 8/2014 | Terpstra ............ H04L 29/06333 370/352 |
| 2014/0351403 A1* | 11/2014 | Lin ........................ H04W 8/06 709/223 |

* cited by examiner

SYSTEM, APPARATUS AND METHOD FOR GENERATING DYNAMIC IPV6 ADDRESSES FOR SECURE AUTHENTICATION

BACKGROUND

Field

Various features relate to communication techniques utilizing an Internet Protocol Version 6 (IPv6) platform for providing secure authentication between one or more user devices and a computer network entity, such as a server.

Background

IPv6 is an Internet Layer protocol for packet-switched internetworking and provides end-to-end datagram transmission across multiple IP networks, following the design principles developed in the previous version of the protocol, Internet Protocol Version 4 (IPv4). In addition to offering more addresses, IPv6 advantageously implements features not present in IPv4. It simplifies aspects of address assignment (e.g., stateless address auto-configuration), network renumbering, and router announcements when changing network connectivity providers. It simplifies processing of packets in routers by placing the responsibility for packet fragmentation into the end points. The IPv6 subnet size is standardized by fixing the size of the host identifier portion of an address to 64 bits to facilitate an automatic mechanism for forming the host identifier from link layer addressing information (e.g., media access control (MAC) address). Network security was a design requirement of the IPv6 architecture, and includes the original specification of Internet Protocol Security (IPsec), which is a protocol suite for secure Internet Protocol (IP) communications by authenticating and encrypting each IP packet of a communication session.

For security purposes, computer network communications, such as web services, are starting to rely on user information such as the browser's user agent (e.g., browser) and/or source IP address to determine if the user is logging into the system from an unrecognized or unexpected location. Authenticated sessions may also be established between a user device (apparatus) and a network entity utilizing cookies or authentication tokens, which allows a certain level of "trust" to be established between a user device and a network entity, and may be accomplished using action-less logging. However, source IP addresses and browser user agents can be easily spoofed, giving web services little protection when a user's password, cookie, or authentication token is compromised.

Recently, techniques such as Cryptographically Generated Address (CGA) generation has been used to increase communication security by validating IP address ownership. CGA is an IPv6 address that has a host identifier computed from a cryptographic hash function, where a public signature key is bound to an IPv6 address in the Secure Neighbor Discovery Protocol (SEND). CGA techniques are typically used in local networks to authenticate ownership of an IP address. A CGA is formed by replacing the least-significant 64 bits of an 128-bit IPv6 address with a cryptographic hash of the public key of the address owner, and the messages are signed with a corresponding private key. The verifier (e.g., local router) may authenticate the message from that corresponding sender only if the source address and the public key are known. This method requires no public key infrastructure. Valid CGAs may be generated by any sender, including a potential attacker, but they cannot use any existing CGAs.

Although CGA is a promising security technique for use with IPv6 addresses, there are limitations and disadvantages. The main disadvantage of using CGA is the high overhead and computational time necessary to generate the address. Also, CGA is not a complete security solution, it solves IP address ownership only on the local area network and still exhibits weaknesses and vulnerabilities to threats. For instance, CGA cannot provide the assurance needed with respect to the authority of the node so there is no guarantee that the CGA address was created from the appropriate node. Attackers on a local network can thus exploit this weakness to create a new valid address from their own public key. Attackers on the local network can also capture Neighbor Discovery (ND) messages and alter the sender's CGA parameters. When this happens the CGA verification process on the receiver's side will fail. Thus the communication between a legitimate sender and receiver is prevented. It is also possible for an attacker to conduct a Duplicate Address Detection DoS Attack which will prevent a CGA node from joining a link. An attacker can copy the CGA parameters and the signature and then respond with a Neighbor Advertisement (NA) message that contains the same security parameters. In this way the attacker can prevent the CGA address configuration for all nodes attached to a local link. Another type of attack is one in which the victim's node is kept busy with the verification process. An attacker will inundate the verifier with valid or invalid CGA signed messages.

Accordingly, there is a need for techniques and technologies for connecting a user device to a network entity, such as a server, that is relatively secure across wide area networks and requires little to no overhead. Further techniques are needed to provide a remote network solution for verifying an IP address.

SUMMARY

Various features relate to secure communications utilizing dynamic IP address generation and public key identifiers.

In certain illustrative embodiments, methods and techniques are disclosed for authenticating a device for secure network communication, comprising obtaining identification data in the device, wherein the identification data is configured as a hash of a public key for identifying at least one of the device and/or a user associated with the device; generating an Internet Protocol (IP) message in the device, wherein an IP source address in the IP message comprises the identification data; registering the device by transmitting the IP message and the public key; generating and transmitting a second IP message after registering the device, wherein an IP source address of the second IP message comprises the identification data; receiving a challenge in the device in response to the second IP message, wherein the challenge is based at least in part on the identification data; and transmitting response data from the device in response to the challenge for authenticating the device for secure network communication.

In certain illustrative embodiments, systems and apparatuses are disclosed for authenticating a device for network communication, comprising: a processor; a memory, operatively coupled to the processor; and a communication interface, operatively coupled to the process and configured to communicate to a network, wherein the processor is configured to obtain identification data in the device, wherein the identification data is configured as a hash of a public key for identifying at least one of the device and/or a user associated with the device, wherein the processor is configured to generate an Internet Protocol (IP) message in the device, wherein an IP source address of the IP message comprises the identification data, and wherein the processor is configured to transmit the IP message and the public key to the communication interface for registering the device, the processor being further configured to generate and transmit, via the communication interface a second IP message after transmitting the IP message, wherein an IP source address of the second IP message comprises the identification data, the communication interface being configured to receive a challenge in response to the second IP message, wherein the challenge is based at least in part on the identification data, and wherein the processor is configured to transmit response data via the communication interface in response to the challenge for authenticating the device for secure network communication.

In certain illustrative embodiments, methods and techniques are disclosed for authenticating a device for network communication, comprising: receiving an Internet Protocol (IP) message, wherein the IP message comprises device identification data in an IP source address, the identification data comprising a hash of a public key for identifying at least one of the device and/or a user associated with the device; registering the device in response to receiving the IP message, and storing a public key and routing prefix associated with the device; receiving a second IP message after registering the device, wherein the second IP message comprises the identification data in an IP source address; selecting a challenge for the device in response to the second IP message, wherein the challenge is based at least in part on the identification data; and receiving response data from the device in response to the challenge for authenticating the device for secure network communication.

In certain illustrative embodiments, aspects of the present disclosure are directed to machine readable storage mediums having stored thereon a computer program for authenticating a device for network communication, the computer program comprising a routine of set instructions for causing the machine to perform the steps of: obtaining identification data in the device, wherein the identification data is configured as a hash of a public key for identifying at least one of the device and/or a user associated with the device; generating an Internet Protocol (IP) message in the device, wherein the IP message comprises the identification data; registering the device by transmitting the IP message; generating and transmitting a second IP message after registering the device, wherein the second IP message comprises the identification data; receiving a challenge in the device in response to the second IP message, wherein the challenge is based at least in part on the identification data; and transmitting response data from the device in response to the challenge for authenticating the device for network communication.

DRAWINGS

Various features, nature and advantages may become apparent from the detailed description set forth below when taken in conjunction with the drawings in which like reference characters identify correspondingly throughout.

Figure 1:
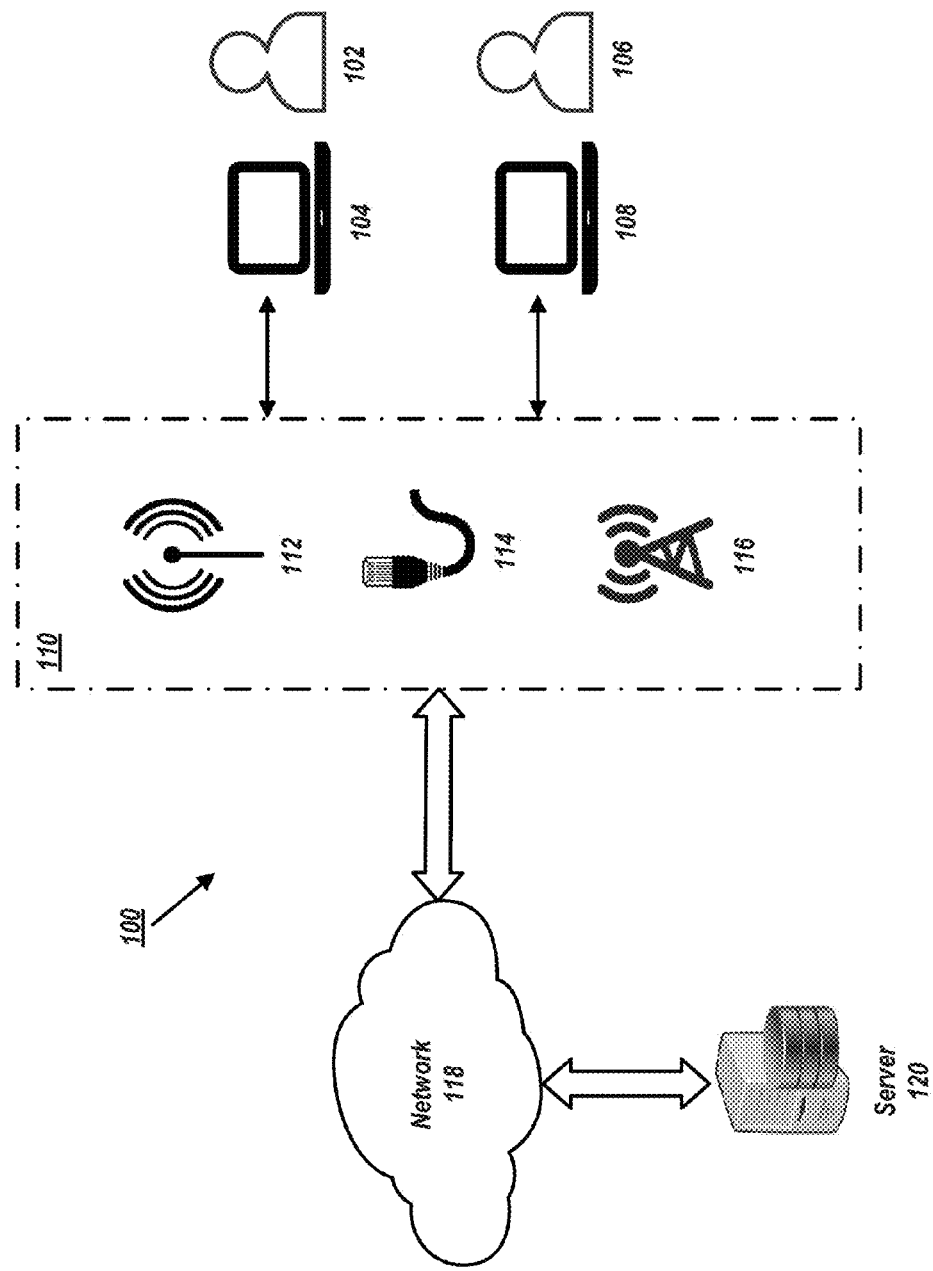
FIG. 1 shows a computer network system that includes one or more users with associated devices that may securely communicate to a server on a network via one or more interfaces under an illustrative embodiment.
Figure 5:
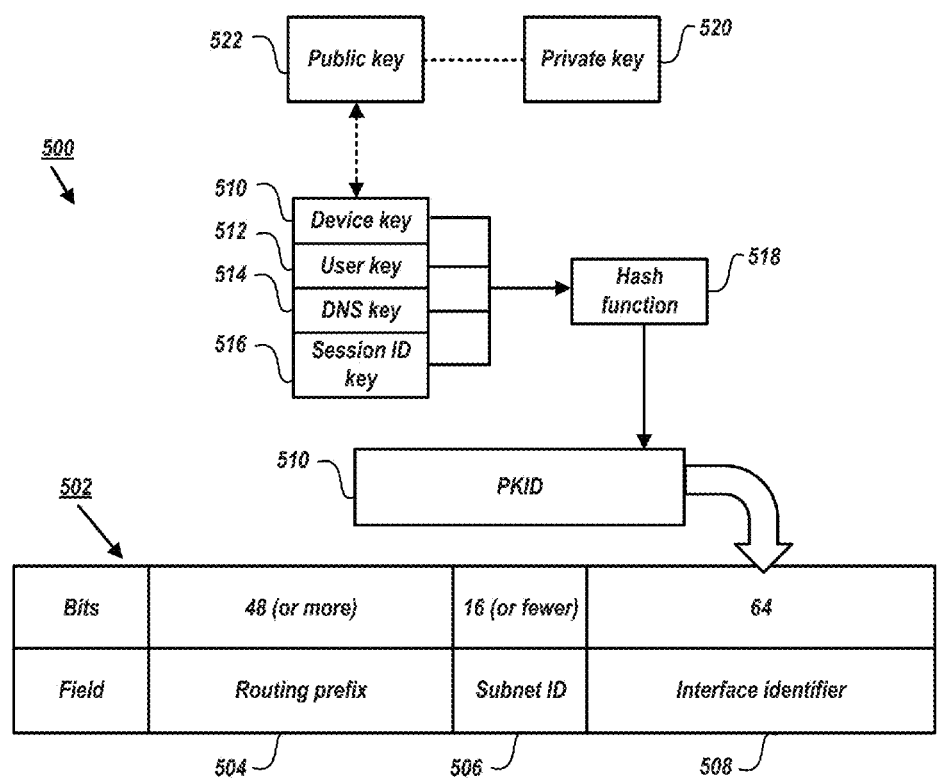
Figure 6:
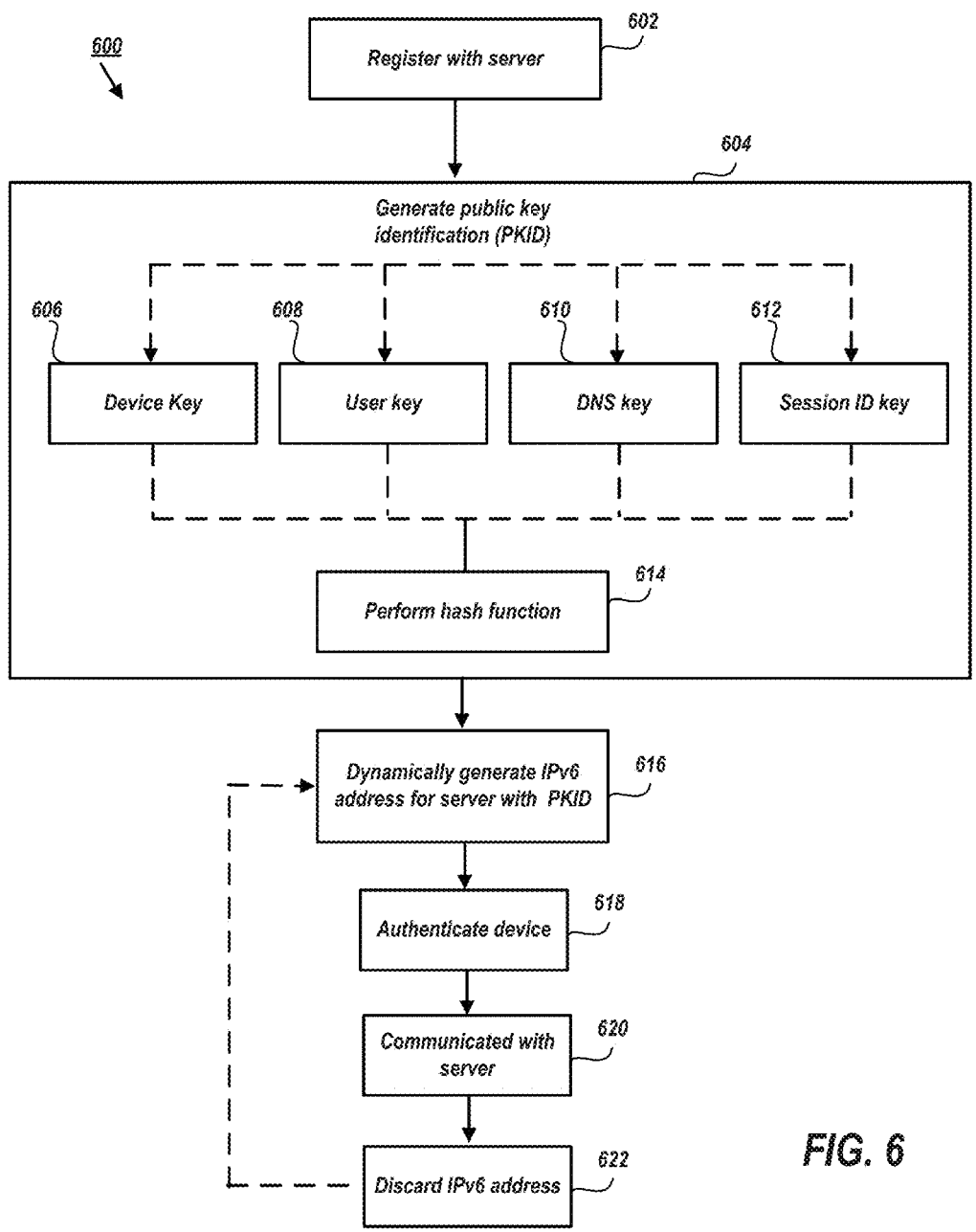
Figure 7:
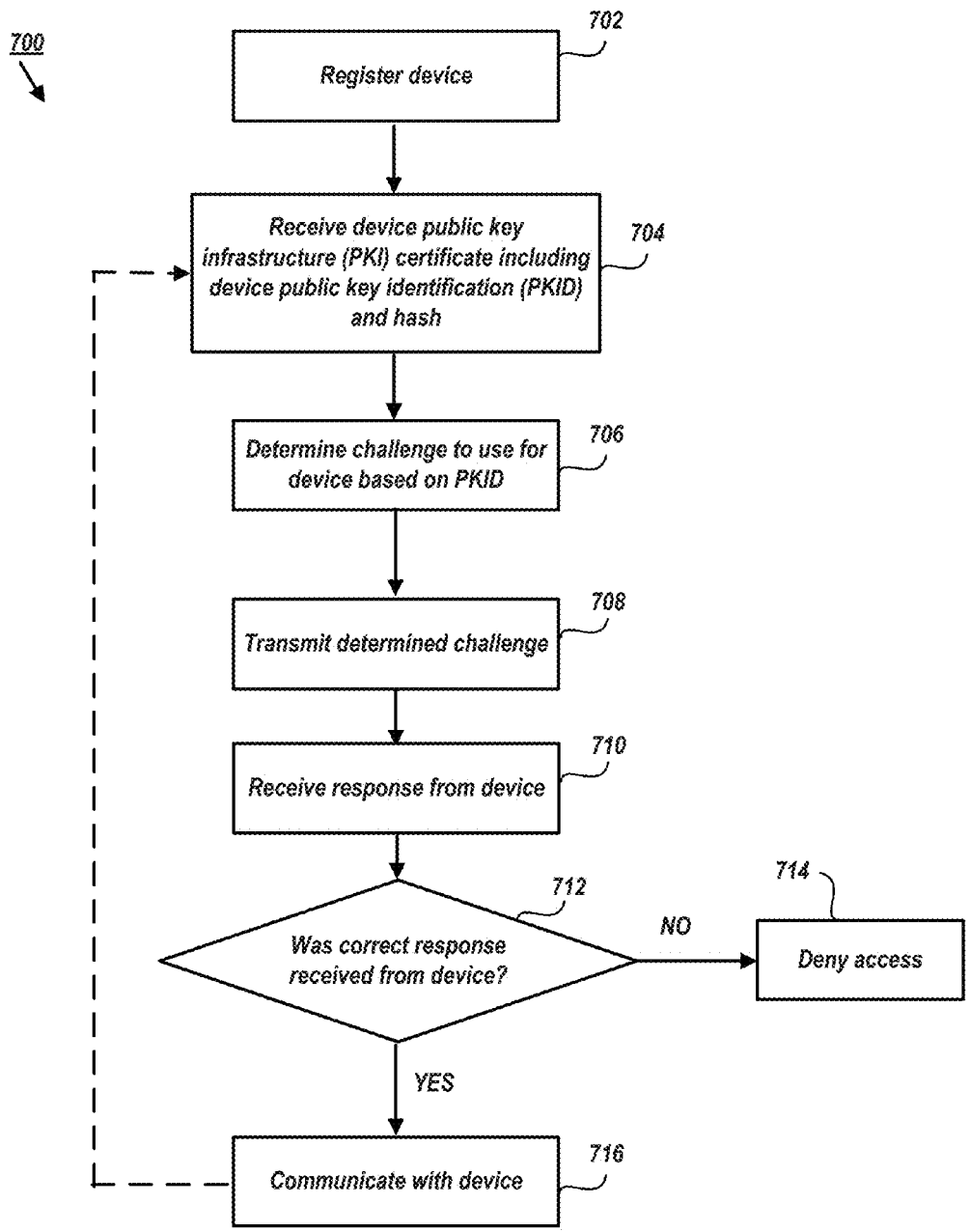
Figure 8:
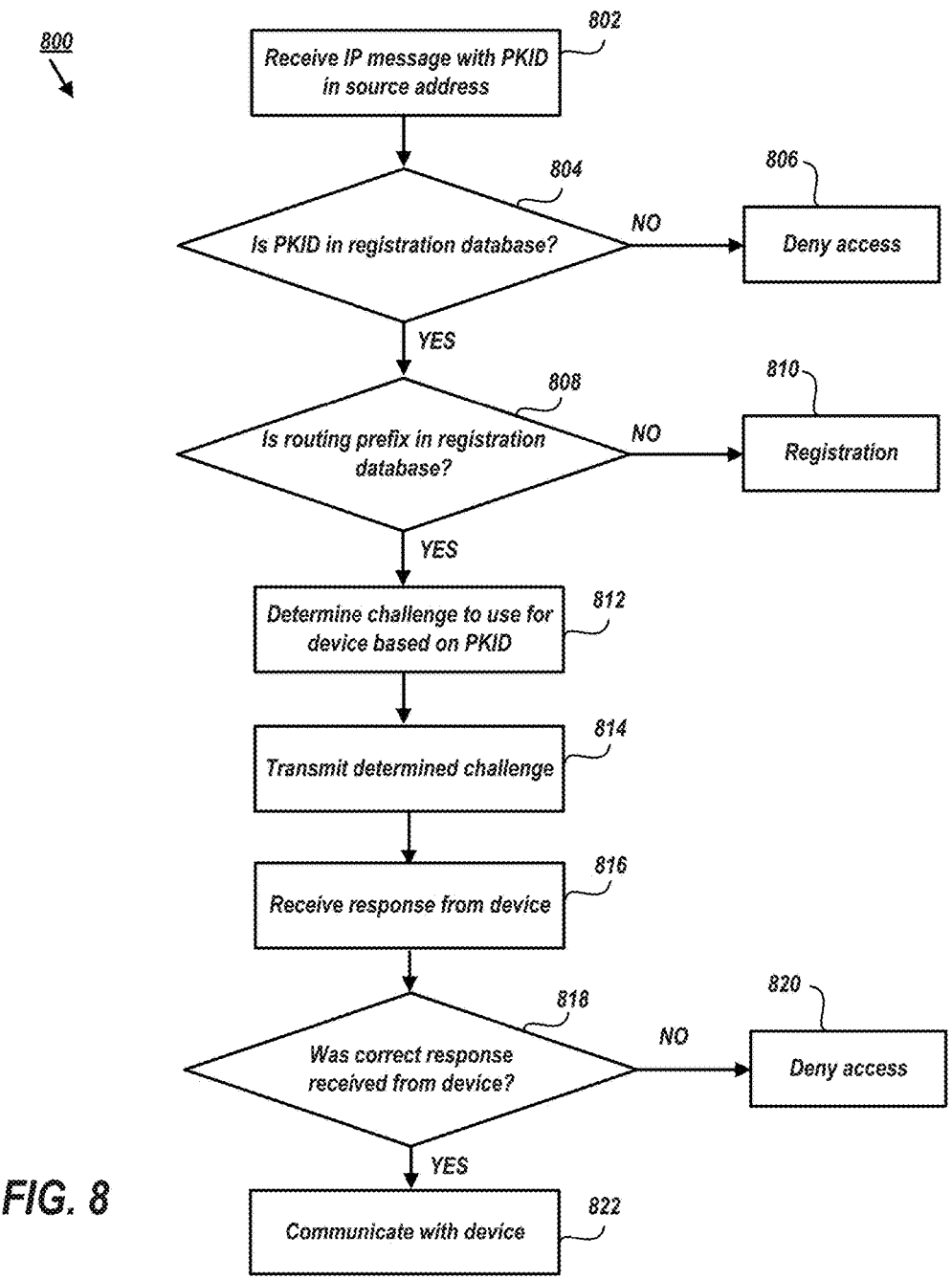
Figure 9:
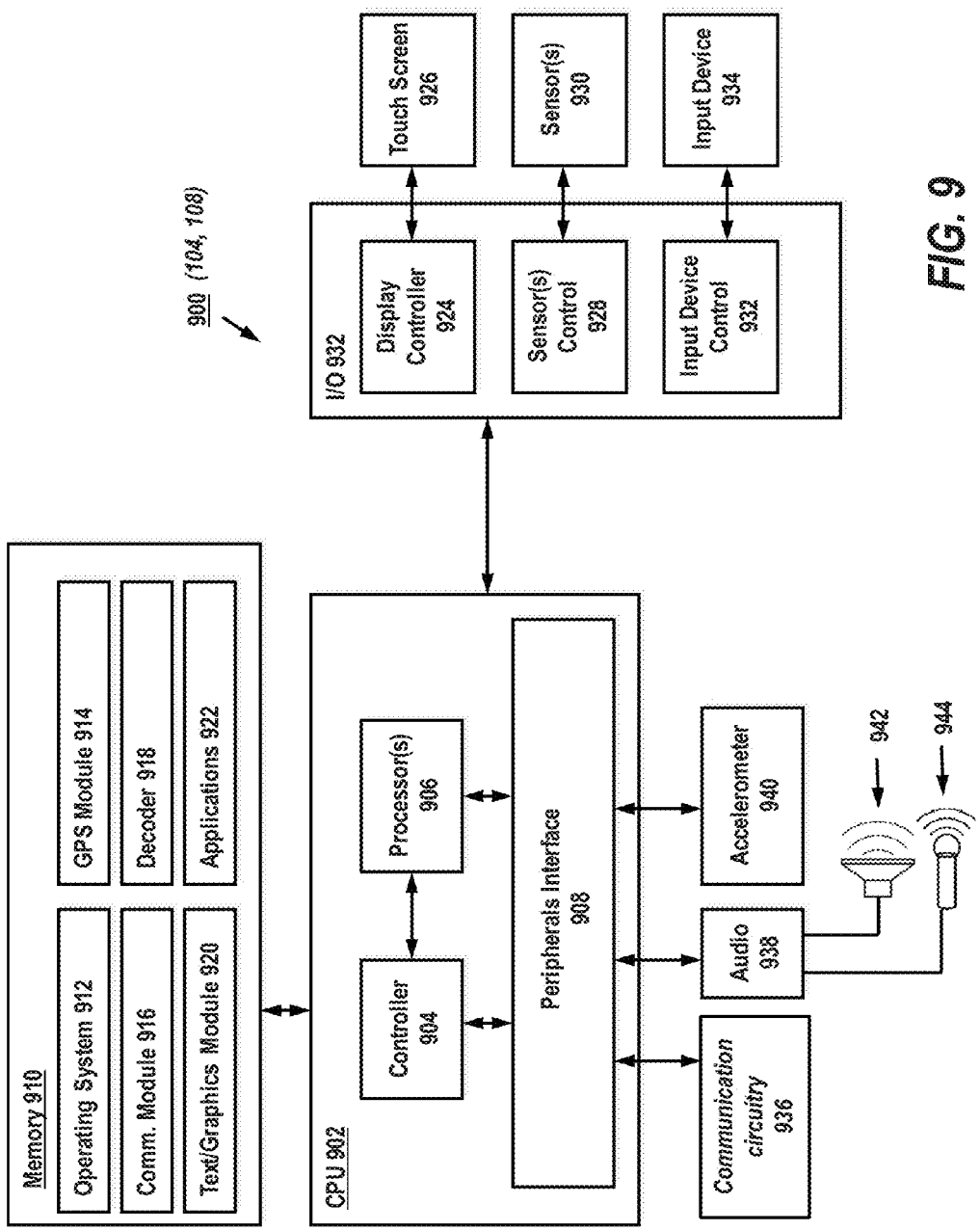
Figure 10:
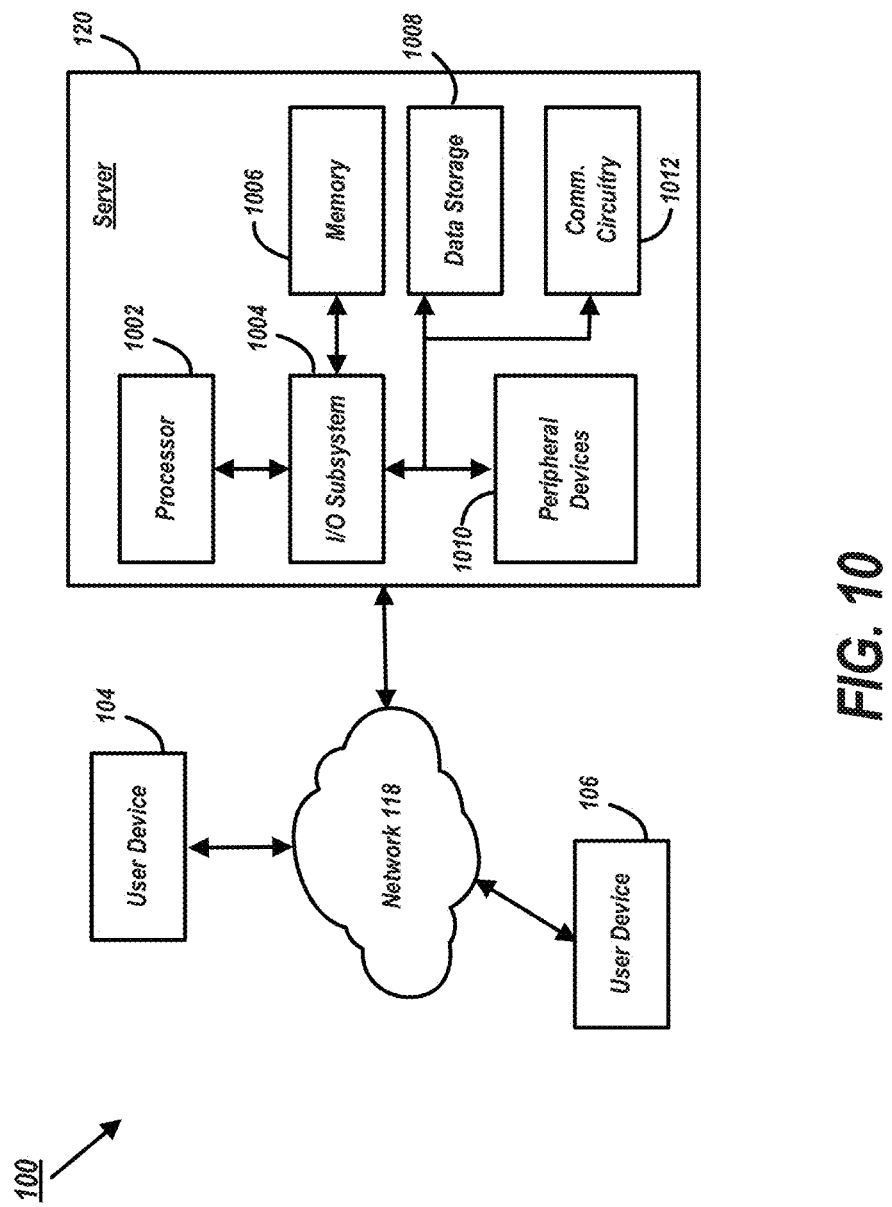
Figure 11:
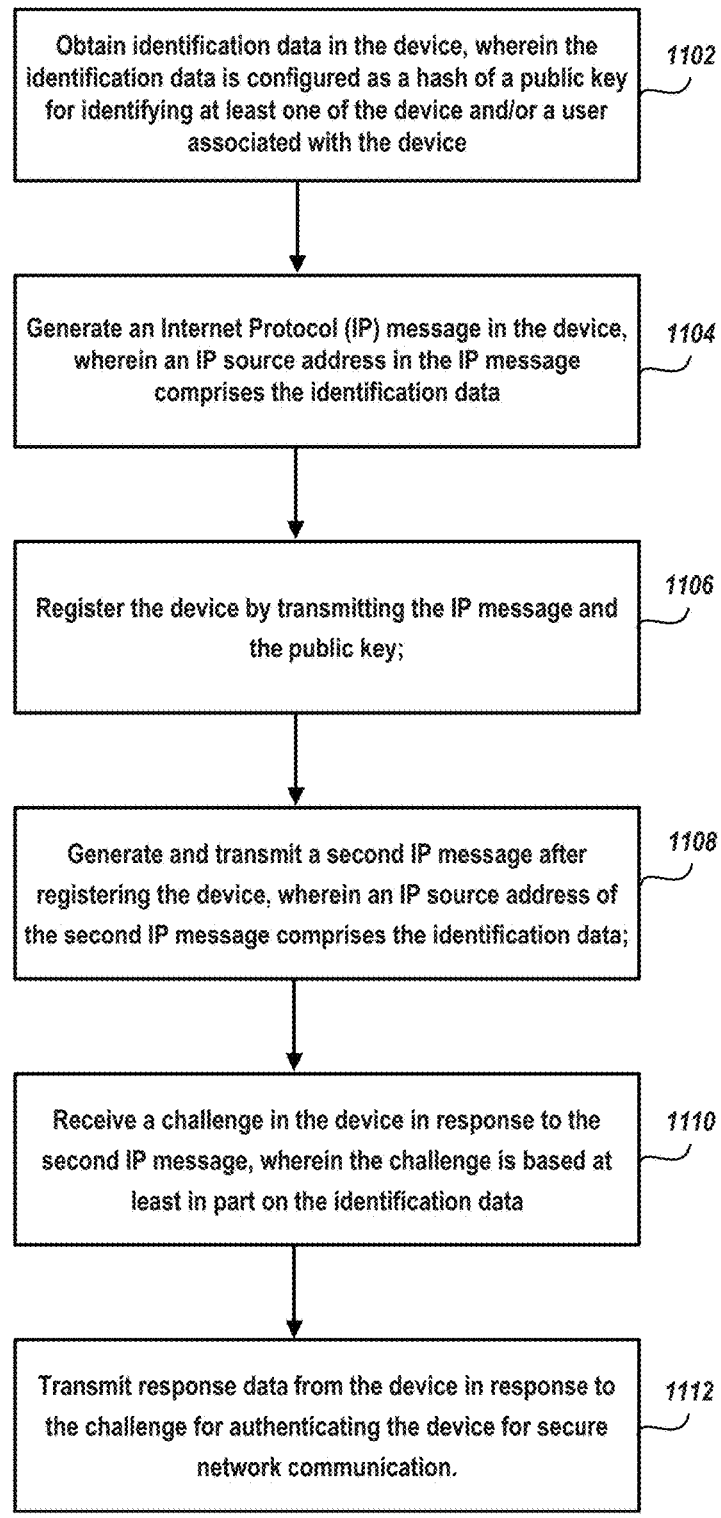
Figure 12:
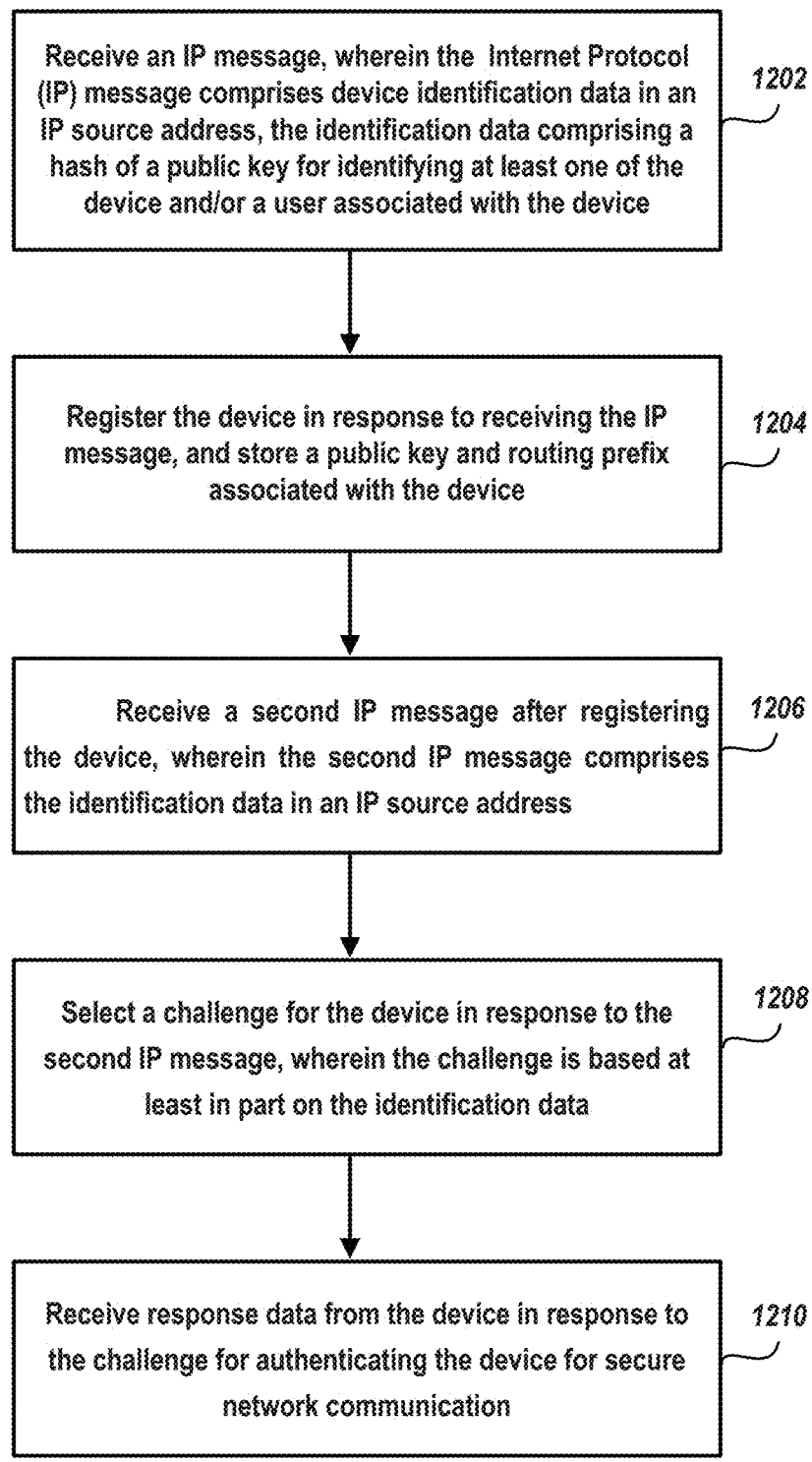

FIG. 5 shown an IPv6 packet that includes a routing prefix, a subnet ID and an interface identifier, wherein a user device from the system of FIG. 1 may dynamically generate an IPv6 address using a public key identifier (PKID);

FIG. 6 shows a process for dynamically generating one or more IPv6 addresses containing a PKID from a user device, and communicating with a server on a network, under an illustrative embodiment;

FIG. 7 shows a process for registering a user device at a server location and receiving and processing PKID data to determine challenge and authentication for the user device under an illustrative embodiment;

FIG. 8 shows a process for registering a user device at a server location using a PKID and a routing prefix to determine challenge and authentication for the user device under an illustrative embodiment:

FIG. 9 is an exemplary block diagram illustrating components and modules of a user, configured to securely communicate under an illustrative embodiment;

FIG. 10 shows a block diagram of a network device, such as a server, configured to register and authenticate a user device for secure communication under an illustrative embodiment;

FIG. 11 shows a process for secure communication for a device by generating IP messages comprising identification data, IP messages being used to register the device and to respond to challenge data that is based at least in part on the identification data under sn illustrative embodiment; and FIG. 12 shows a process for establishing secure communication with a device by receiving IP messages comprising identification data, wherein the IP messages are used to register the device and to provide challenge data that is based at least in part on the identification data under sn illustrative embodiment.

DETAILED DESCRIPTION

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Overview

Some features pertain to creating a secure session for user authentication, where a user device may dynamically create and use a secondary source IPv6 address with a unique interface identifier for a portion of the address (e.g., the last 64 bits) as a hash of the public key of a device certificate, website specific information, and/or session specific information. The server can quickly validate the address and with a reliable probability determine the public key it should use to challenge the client with. After a time-out or expiration of a session, the secure IPv6 address may be removed.

Exemplary System for Dynamically Generating IPv6 Addresses

Many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any tangible form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Turning now to an overview of the relevant operating environment, the disclosed embodiments function in a conventional communication system that includes message/information transfer across and within both the public Internet and private networks. TCP (Transmission Control Protocol) and IP (Internet Protocol), known collectively as TCP/IP, are the basic communication protocols of the Internet. TCP/IP are often referred to as "lower layer" protocols because other so-called "higher layer" application protocols typically use TCP/IP to get to the Internet. Such higher layer application protocols include the World Wide Web's Hypertext Transfer Protocol (HTTP), the File Transfer Protocol (FTP), Telnet (Telnet), which lets users log-on to remote computers, and the Simple Mail Transfer Protocol (SMTP). These and other protocols are often packaged together with TCP/IP as a "suite." Because TCP/IP can be used as communications protocols in both the public Internet and private networks, virtually all computers and other similar devices with direct access to the public Internet communicate and exchange messages/information using a TCP/IP program.

Generally, TCP/IP operates as a two-layer protocol. The top layer, TCP, manages the assembling of a message or file into smaller packets that are transmitted over the Internet and received by a TCP layer that reassembles the packets into the original message. The lower layer, IP, handles the address part of each packet so that it gets to the right virtual destination. Each gateway computer on a network checks this address to determine where to forward the message. Even though some packets from the same message may be routed differently than others, all of the packets are reassembled at the virtual destination. In certain illustrative embodiments, the present disclosure shows techniques and technologies for providing secure communication via a personal key identifier embedded/inserted into the lower IP layer, discussed in greater detail below.

The higher-layer applications (e.g., HTTP, FTP, etc.) utilize TCP/IP in the client/server model of communication in which a computer user (i.e., a client) requests and is provided a service (e.g., sending a Web page) by another computer (e.g., a server) in the network. TCP/IP communication is primarily point-to-point, which means each communication is from one point (or host computer) in the network to another point (or host computer) in the network. TCP/IP and the higher-layer applications (e.g., HTTP, FTP, etc.) that use it are collectively said to be "stateless" because each client request is considered a new request unrelated to any previous one (unlike ordinary phone conversations that require a dedicated connection for the call duration). Being stateless frees network paths so that clients and servers can use them continuously. The TCP layer itself is not stateless with respect to an individual message because a connection must remain in place at least long enough for all packets in a message to be received.

FIG. 1 shows a computer system 100 that includes a device 104, associated with a user 102 and a device 108, associated with a user 106, where the devices 104, 108 are configured to communicate to a remote entity, such as a server 120 on a computer network 118, via an interface 110. In certain embodiments, the interface 110 may include any of a wireless (e.g., Wi-Fi) interface 112, a wired (e.g., Ethernet) interface 114 or a cellular interface (e.g., Global System for Mobile Communications (GSM), Universal Mobile Telecommunications System (UMTS), Long-Term Evolution (LTE), etc.) 116 for communicating to and from the computer network 118.

In certain illustrative embodiments, the interface 110 may include only one type of interface (e.g., wireless interface 112). In other illustrative embodiments, the interface 110 may include multiple types of interfaces and even may be divided or distributed among a plurality of interfaces or interface devices at a given location. The computer network 118 may include routing devices and systems, and may include the public internet and/or private IP networks. It should be understood by those skilled in the art that the system 100 may include additional hardware and/or software, and that the figure has been simplified for the sake of brevity. Also, while the present disclosure makes reference to a "server" (e.g., 120), it should be understood that the term is illustrative only, and that any device capable of packet communication may be substituted, or used in addition to, a server. Similarly, the devices 104, 108 may be any devices capable of communicating over a packet based network, such as cellular phones, smart phones, tablets, laptops, personal computers, digital appliances, and the like.

The system 100 may comprise a commercially available, off-the-shelf network web server hardware device (e.g., server 120) configured to have at least one static address that does not ordinarily change. Thus, network web server hardware may have the functionality of a conventional web server host device that can be reliably accessed by another device (e.g., 104, 108) connected to the network (e.g., Internet). Network web server hardware may include network web server software, along with a database (not shown) that may be a separate device or incorporated within network web server hardware. The network web server hardware and database may be located within a private IP network or located within a public Internet, or anywhere reliably accessible by devices 104, 108 and their related web clients. In an example, a web client may be a conventional web browser (not shown) or any hardware/software component capable of serving as the client side of a client-server session over computer network 118. The web client may be operated by a human user, or it may be operated by an automated tool/script/machine that uses the HTTP protocols (or others) to automatically access HTTP (or other) servers. Such automated tools are usually referred to as "HTTP agents."

As will be explained in further detail below, in certain illustrative embodiments, the devices 104, 108 may securely communicate via IPv6 messages with the server 120 using a public key identifier (PKID) that contains a hash of the user's (102, 106) public key in the IPv6 address. By structuring the PKID to be an appropriate size (e.g., 64 bits), the PKID may be inserted into the IPv6 address to serve as a security function identifying the device and/or user and to allow a connecting server to determine a correct challenge to send to the user device (104, 108), based on the PKID. In other words, the PKID is not just a device/user identifier, but may function as a device public key "pointer" or "clue" to allow a server to send a proper challenge for validating the user device (104, 108) private key. In illustrative embodiments, the PKID may be inserted into an interface identifier portion of an IPv6 address and provided to the server 120 on an initial registration. On subsequent connections to the server 120, the device (104, 108) may dynamically generate a new IPv6 address containing the PKID during the connection process. Here, since the server 120 has the PKID for the user device stored, the server 120 may automatically identify the user device (104, 108) based on the PKID in the IPv6 address.

In certain illustrative embodiments, the server 120 may additionally use a subnet prefix portion of the IPv6 address together with the PKID to identify a user device (104, 108). The high-order bits of an IPv6 address specify the network, and the rest specify particular addresses in that network. Thus, for example, all the addresses in one network would have the same first N bits (i.e., "prefix") while the smaller subnetworks would have their own respective M bits (i.e., "subnet prefix) following the prefix. Those first N bits are called the "prefix". Since the subnet prefix portion of the IPv6 address identifies the interface 110 (subnet), an additional security element may be advantageously provided since, even if a PKID was hacked, there would be a very small likelihood that a hacked or spoofed PKID would connect from the same subnet as the original user.

Because of the nature of IPv6 communication, multiple IP addresses to be generated by the user (104, 108) on a single interface (e.g., Wi-Fi or cellular), and may be dynamically created and deleted. Since the PKID is tied to the device (104) and user (102), PKIDs may be generated and used over multiple IPv6 addresses. The subnet prefix may vary across home, work, and cellular networks. While a primary IPv6 address may be used for traditional IP traffic, the additional IPv6 addresses with PKIDs can be dynamically generated and used for secure sessions, with IPv6 address being removed after the session is terminated or user/device is no longer authenticated.

Figure 2:
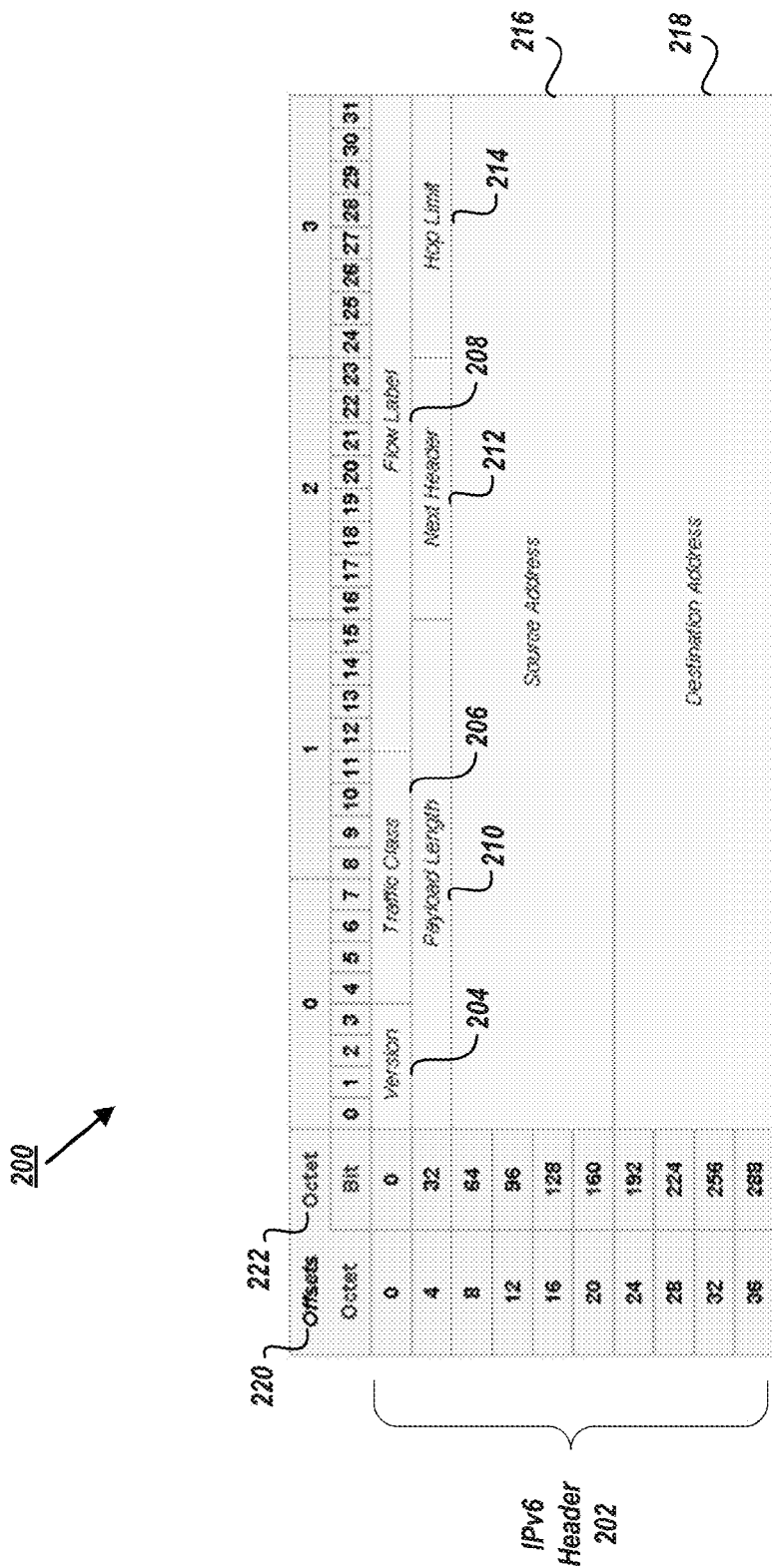
FIG. 2 shows a IPv6 packet that includes an IPv6 header, authentication header and encapsulating security payload, where the IPv6 Header portion of the IPv6 packet is shown under an illustrative embodiment.

Exemplary Data Structure and Processing for Dynamically Generating IPv6 Addresses Turning to FIG. 2, an IPv6 header 202 portion of an IPv6 message 200 (or "packet") is shown under an illustrative embodiment. It should be understood that the IPv6 message 200 is illustrated in the present disclosure as separate portions, namely, the IPv6 header 202 of FIG. 2, the authentication header 302 of FIG. 3, and the IPv6 header 402 of FIG. 4. The heading for each portion illustrating the offset octets 220, octet bit 222, IPv6 bytes (0-3) and respective bit (0-31) are carried through each of these examples for the purposes of clarity.

IPv6 messages may be configured to include control information for addressing and routing, and a payload consisting of user data. The control information in IPv6 messages is subdivided into a mandatory fixed header and optional extension headers. The payload of an IPv6 message is typically a datagram or segment of the higher-level Transport Layer protocol, but may be data for an Internet Layer (e.g., ICMPv6) or Link Layer (e.g., OSPF) instead. IPv6 messages are typically transmitted over a Link Layer protocol (e.g., Ethernet) which encapsulates each packet in a frame. IPv6 packets may implement path MTU discovery so that a node on the computer network (e.g., 118) may use the IPv6 fragment header to fragment the packet at the source and have it reassembled at the destination(s).

FIG. 2 shows an illustrative IPv6 header 202 packet that may include its first 40 octets (320 bits), and may have the format illustrated in the figure. The version field 204 of IPv6 header 202 may comprise 4 bits, and indicates the IP protocol version used in the communication. Thus, for IPv6, the version value would be a constant "6" or 0110. The traffic class field 206 may comprise 8 bits holding two values. The 6 most-significant bits may be used for differentiated services, which is used to classify packets. The remaining two bits may be used for Explicit Congestion Notification (ECN). Priority values for ECN may be subdivided into ranges including traffic where the source provides congestion control and non-congestion control traffic. The flow label field 208 may comprise 20 bits, and may serve as a hint to routers and switches with multiple outbound paths that these packets should stay on the same path so that they will not be reordered.

The payload length field 210 may comprise 16 bits and may be used to indicate the size of the payload in octets, including any extension headers. The length may set to zero when a hop-by-hop extension header carries a "jumbo payload" option. The next header field 212 may specify the type of a next header. As an example, this filed may specify the transport layer protocol used by a packet's payload. When extension headers are present in the packet, this field may indicate which extension header follows. The hop limit field 214 may be set to a value to limit the "hops" the message makes across nodes. The set value may be decremented by one at each intermediate node visited by the message. When the counter reaches 0 the packet is discarded. The source address field 216 provides the IPv6 address of the sending node, while the destination address field 218 provides the IPv6 address of the destination node(s).

Figure 3:
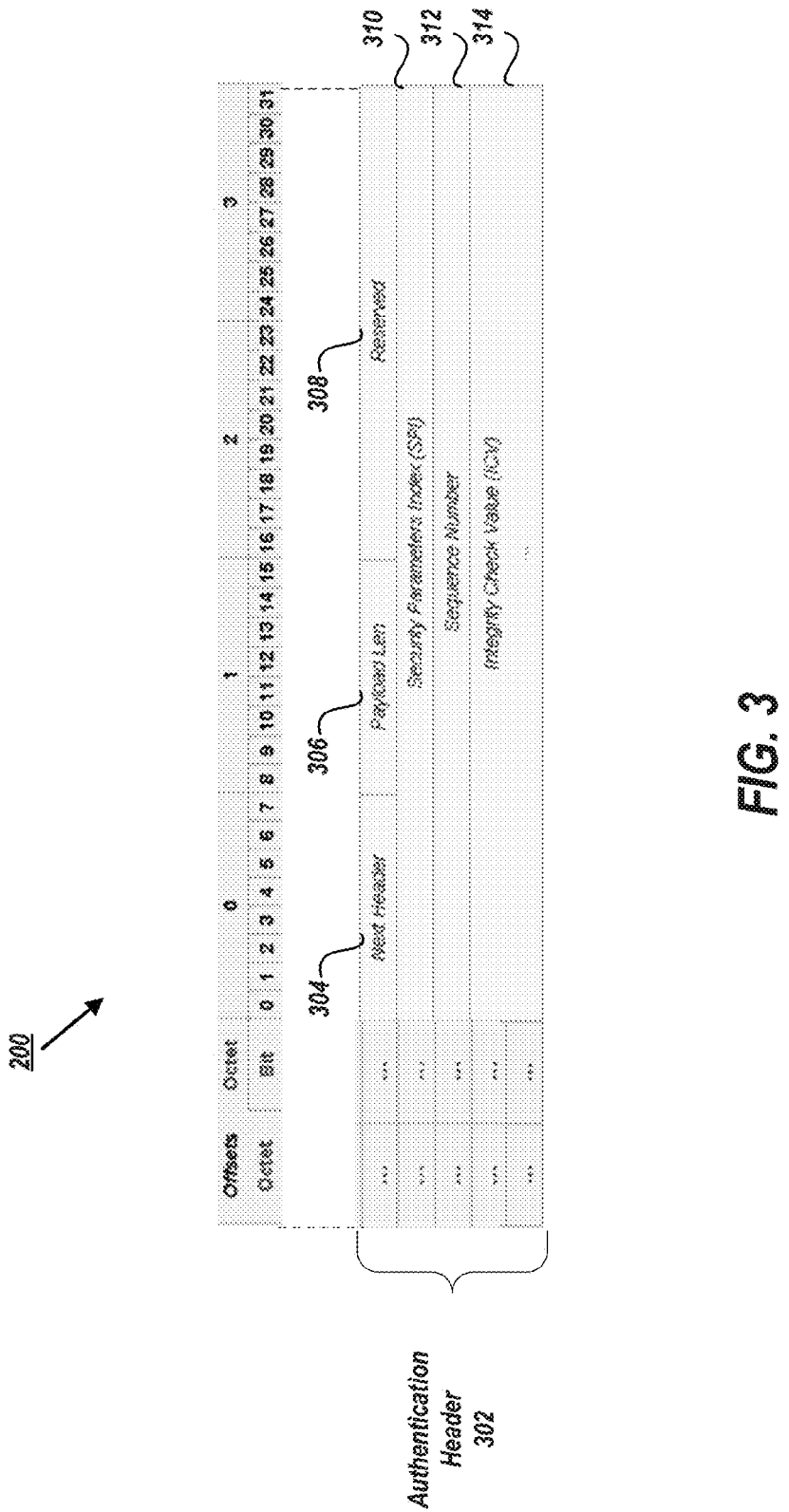
FIG. 3 shows an authentication header portion of the IPv6 packet under an illustrative embodiment.

Turning to FIG. 3 an authentication header (AH) 302 configuration for an IPv6 message 200 is shown under an illustrative embodiment. Generally speaking, the AH is a part of the IPsec protocol suite, which is a protocol suite for secure IP communications by authenticating and encrypting each IP message (packet) of a communication session. IPsec includes protocols for establishing mutual authentication between agents at the beginning of the session and negotiation of cryptographic keys to be used during the session. IPsec can be used in protecting data flows between a pair of hosts (host-to-host), between a pair of security gateways (network-to-network), or between a security gateway and a host (network-to-host). Using cryptographic security services, IPsec may protect communications over Internet Protocol (IP) networks. IPsec supports network-level peer authentication, data origin authentication, data integrity, data confidentiality (encryption), and replay protection.

IPsec may be configured as an end-to-end security scheme operating in the Internet Layer of the Internet Protocol Suite, while some other Internet security systems in widespread use, such as Transport Layer Security (TLS) and Secure Shell (SSH), operate in the upper layers at the Application layer. Accordingly, IPsec may be the only protection for all application traffic over an IP network. Multiple applications can be automatically secured by IPsec at the IP layer.

AH 302 may be configured to ensure connectionless integrity and data origin authentication of IP messages. Further, it can optionally protect against replay attacks by using the sliding window technique and discarding old messages. In IPv6, the AH 302 may protect most of the IPv6 base header, AH itself, non-mutable extension headers after the AH, and the IP payload. Protection for the IPv6 header may exclude mutable fields in an IPv6 message, such as differentiated services code point (DSCP), ECN, flow label, and hop limit. AH may operate directly on top of IP, using IP protocol number 51. In order to increase performance, the AH 302 may have no checksum to protect it.

FIG. 3 shows an AH 302 packet diagram illustrating how an AH packet may be constructed and interpreted. The next header field 304 may comprise 8 bits indicating a type of the next header, indicating what upper-layer protocol was protected. The value may be taken from the list of IP protocol numbers. The payload length field 306 may comprise 8 bits indicating the payload length expressed in 4-octet units, minus 2. For example, an AH value of 4 equals 3×(32-bit fixed-length AH fields)+3×(32-bit ICV fields)−2 and thus an AH value of 4 means 24 octets. Although the size is measured in 4-octet units, the length of this header should be a multiple of 8 octets if carried in an IPv6 packet. The reserved field 308 is reserved for future use and may be set to all zeroes until such point it is used. The security parameter index field 312 may comprise 32 bits and be set to an arbitrary value that is used, together with the destination IP address, to identify the security association of the receiving party. The sequence number field 312 may comprise 32 bits functioning as a monotonic strictly increasing sequence number (incremented by 1 for every packet sent) to prevent replay attacks. When replay detection is enabled, sequence numbers are not reused, because a new security association must be renegotiated before an attempt to increment the sequence number beyond its maximum value. The integrity check value field 314 may comprise 32 bits functioning as a variable-length check value and protects both the payload and IP header values including the source and destination IP address. The integrity check value field 314 may contain padding to align the field to an 8-octet boundary for IPv6.

Figure 4:
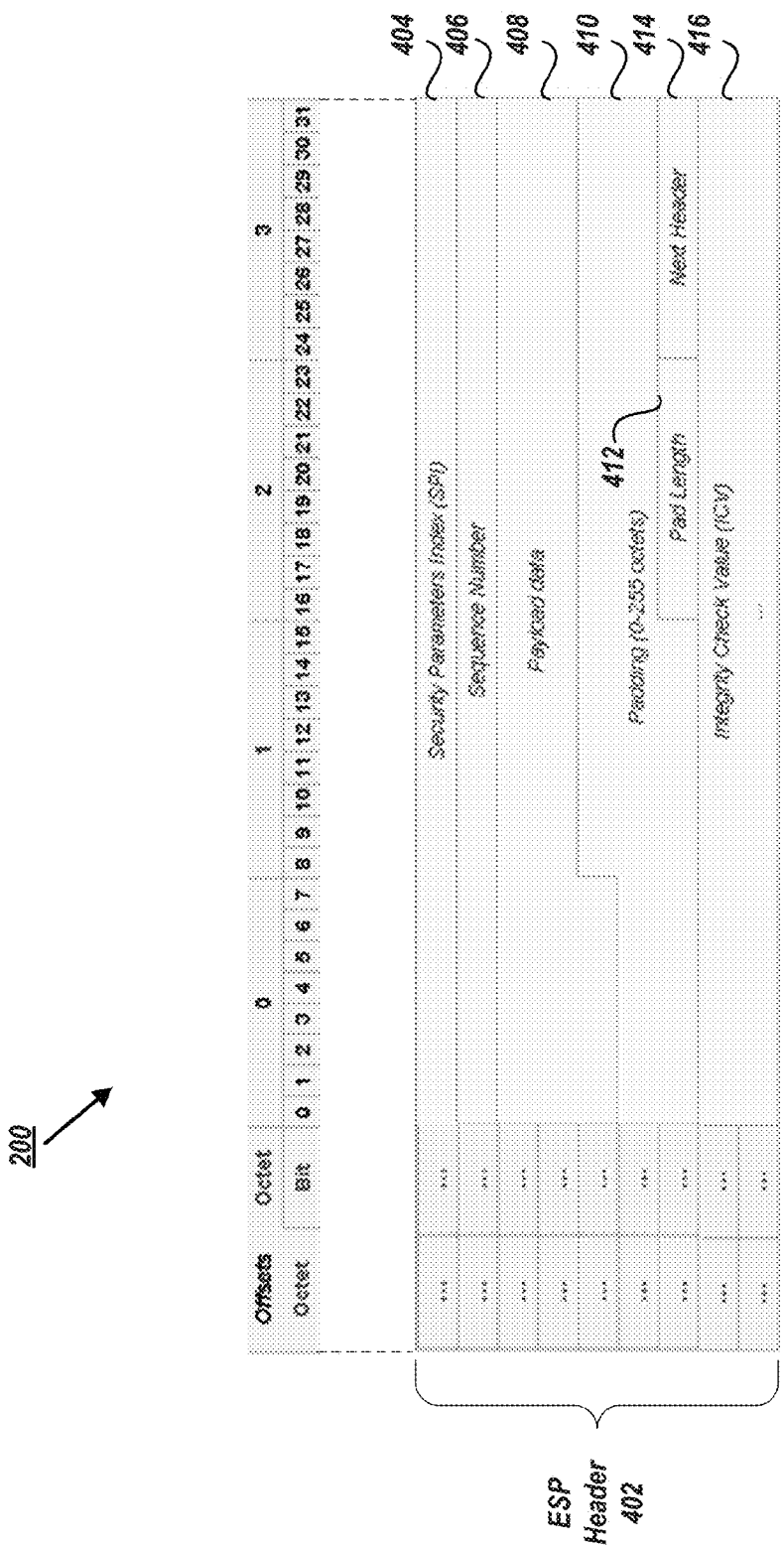
FIG. 4 shows an encapsulating security payload portion of the IPv6 packet under an illustrative embodiment.

FIG. 4 shows an Encapsulating Security Payload (ESP) header portion 402 of IPv6 message 200 under an illustrative embodiment. Similar to AH, ESP is also a part of the IPsec protocol suite. During operation, the ESP may provide origin authenticity, integrity and confidentiality protection of packets. The ESP may also support encryption-only and authentication-only configurations. Unlike the AH 302, the ESP in transport mode may not provide integrity and authentication for the entire IP packet. However, in Tunnel Mode, where the entire original IP packet is encapsulated with a new packet header added, ESP protection is afforded to the whole inner IP packet, including the inner header. The ESP may be configured to operate directly on top of the IP, using IP protocol number 50.

The figure shows a packet diagram illustratively showing how an ESP header 402 may be constructed and interpreted. The security parameters index field 404 may comprise 32 bits representing an arbitrary value, together with the destination IP address to identify the security association of the receiving party (e.g., server 120). The sequence number field 406 may comprise 32 bits and represent a monotonically increasing sequence number (incremented by 1 for every packet sent) to protect against replay attacks. The sequence number field may be configured to keep a separate counter for every security association. The payload data field 408 may comprise a variable number of bits that include the protected contents of the original IP message, including any data used to protect the contents, such as an initialization vector for the cryptographic algorithm used. The type of content protected may be indicated by a next header field (e.g., 212). The padding field 410 may comprise 0-255 octets to include padding for encryption, to extend the payload data to a size that fits the encryption's cipher block size, and to align the next field. The pad length field 412 may comprise 8 bits indicating the size of the padding in octets, and the next header field 414 may comprise 8 bits indicating a type of the next header. The value for the next header may be taken from a list of IP protocol numbers under one example, however in this case it there is usually no additional headers. The integrity check value field 416 may comprise 32 bits and may function as a variable length check value, and contain padding to align the field to an 8-octet boundary for IPv6.

Turning to FIG. 5, an exemplary environment 500 is shown for generating a PKID and transmitting it within an IPv6 address 502 via an interface identifier filed 508. As discussed above, an IPv6 address 502 may comprise 128 bits, where addresses are classified into various types for applications in the major addressing and routing methodologies, such as unicast, multicast, and anycast networking. In each of these, various address formats are recognized by logically dividing the 128 address bits into bit groups and establishing rules for associating the values of these bit groups with special addressing features. For unicast and anycast address format, the addresses may comprise a plurality of logical parts, including a 64-bit network prefix comprising a routing prefix 504 combined with a subnet ID 506, used for routing, and a 64-bit interface identifier 508 used to identify a host's network interface.

The network prefix (the routing prefix 504 combined with the subnet ID 506) may be contained in the most significant 64 bits of the address. The size of the routing prefix may vary, where a larger prefix size may indicate a smaller subnet ID size. The bits of the subnet ID field 504 may be available to the network administrator to define subnets within the given network. The interface identifier 508 may be either automatically generated from the interface's media access control (MAC) address using a modified Extended Unique Identifier (e.g., EUI-64) format, obtained from a Dynamic Host Configuration Protocol (e.g., DHCPv6) server, automatically established randomly, or assigned manually. In our application the PKID is automatically assigned to the interface identifier when a secure session in initiated. A link-local address may also be based on the interface identifier, but uses a different format for the network prefix. However, automatically generated MAC addresses may be readily spoofed, creating vulnerabilities in network communication.

Under an illustrative embodiment, a user device (e.g., 104, 108) may comprise a private key 520 (or secret) and a public key 522 (or public key certificate, digital certificate, identity certificate) for network authentication under PKI or other authentication protocols. In one example, public-key cryptography may be advantageously used to secure electronic communication of messages over an open networked environment such as the Internet, without relying on a covert channel, even for key exchange. Since open networked environments are susceptible to a variety of communication security problems (e.g., "man-in-the-middle" attacks), security properties are required for communication to typically include that the communication being sent must not be readable during transit (preserving confidentiality), the communication must not be modified during transit (preserving the integrity of the communication), the communication must originate from an identified party (sender authenticity) and to ensure non-repudiation or non-denial of the sending of the communication.

In this example, asymmetric key algorithms may be utilized, where a key used by one party to perform either encryption or decryption is not the same as the key used by another in the counterpart operation. Each user has a pair of cryptographic keys, which may comprise a public encryption key and a private decryption key. For example, a key pair used for digital signatures may comprise a private signing key (e.g., 520) and a public verification key (e.g., 522). The public key (e.g., 522) may be widely distributed, while the private key (e.g., 520) is known only to its user. The keys are related mathematically, but the parameters are chosen so that calculating the private key (e.g., 520) from the public key (e.g., 522) is unfeasible. In contrast, symmetric-key algorithms use a single secret key (e.g., 520), which must be shared and kept private by both the sender and the receiver, for example in both encryption and decryption. To use a symmetric encryption scheme, the sender and receiver should securely share a key (e.g., 520) in advance. Because symmetric key algorithms are typically less computationally intensive than asymmetric ones, keys may be exchanged using a key-exchange algorithm such as ones based on Internet Key Exchange (e.g., IKE, IKEv2), and data may be transmitted using that key and a symmetric key algorithm. Pretty-good privacy (PGP), IP Security (IPsec) and the Transport Layer Security/Secure Sockets Layer (SSL/TLS) techniques use this procedure, and are referred to as "hybrid" cryptosystems.

Some examples of public key cryptography include public key encryption and digital signatures. Public key encryption encrypts a message with a user's public key (e.g., 522). The message cannot be decrypted by anyone who does not possess the matching private key (e.g., 520), who is thus presumed to be the owner of that key and the person associated with the public key (e.g., 522). This is used in an attempt to ensure confidentiality. Digital signatures may utilize a message signed with the user's private key (e.g., 520) and can be verified by anyone who has access to the user's public key (e.g., 522). This verification proves that the sender had access to the private key (e.g., 520), and therefore is likely to be the person associated with the public key (e.g., 522). This also ensures that the message has not been tampered with, as any manipulation of the message will result in changes to the encoded message digest, which otherwise remains unchanged between the sender and receiver.

Another example includes authentication with X.509 certificates, which make use of a PKI to securely authenticate users. After users receive their X.509 certificates from a certificate issuing Certification Authority (CA), they can use them to securely access remote entities, such as servers. When using authentication with user certificates, each user possesses a key pair, comprising a public (e.g., 522) and a private key (e.g., 520). The public key may be contained in the X.509 client certificate and can be made public. However, the user's private key (e.g., 520) is not shared.

Yet another example includes authentication with the Fast Identity Online (FIDO) specifications that support multifactor authentication (MFA) and public key cryptography. Unlike password databases, FIDO stores personally identifying information (PII) such as biometric authentication data locally on the user's device to protect it. By abstracting the protocol implementation with application programming interfaces (APIs), FIDO also reduces the work required for developers to create secure logins for mobile clients running different operating systems (OSes) on different types of hardware. FIDO supports the Universal Authentication Framework (UAF) protocol and the Universal Second Factor (U2F) protocol. With UAF, the user device (e.g., 104, 108) may create a new key pair during registration with an online service and retains the private key (e.g., 520); the public key (e.g., 522) may be registered with the online service. During authentication, the client device (e.g., 104, 108) proves possession of the private key (e.g., 520) to a server (e.g., 120) by signing a challenge, which involves a user-friendly action such as providing a fingerprint, entering a PIN or speaking into a microphone. With U2F, authentication a strong second factor, such as a Near Field Communication (NFC) tap or USB security token may be required for full authentication.

In a still further example, IPsec, discussed above, may be used for secure IP communications by authenticating and encrypting each IP message of a communication session. IPsec includes protocols for establishing mutual authentication between agents at the beginning of the session and negotiation of keys (e.g., 520, 522) to be used during the session. IPsec can be used in protecting data flows between a pair of hosts (host-to-host), between a pair of security gateways (network-to-network), or between a security gateway and a host (network-to-host). The IP security architecture may utilize security association as a basis for building security functions into IP. A security association may be considered the bundle of algorithms and parameters (such as keys) that is being used to encrypt and authenticate a particular flow in one direction. Therefore, in normal bi-directional traffic, the flows are secured by a pair of security associations. Security associations may be established using the Internet Security Association and Key Management Protocol (ISAKMP). ISAKMP may be implemented by manual configuration with pre-shared secrets, Internet Key Exchange (IKE and IKEv2), Kerberized Internet Negotiation of Keys (KINK), and the use of IPSECKEY DNS records. In order to decide what protection is to be provided for an outgoing packet, IPsec uses the SPI 310, an index to the security association database (SADB), along with the destination address in a message header (e.g., 202), which together uniquely identify a security association for that packet. A similar procedure is performed for an incoming packet, where IPsec gathers decryption and verification keys from the security association database. Exemplary authenticating algorithms include, but are not limited to, secure hash (e.g., hash-based message authentication codes (HMAC) having secure hash algorithms (SHA) including, but not limited to, HMAC-SHA1-3, HMAC-SHA-256, MD5 message-digest algorithm (HMAC-MD5)), and Galois/Counter Mode (e.g., AES-GCM) authentication.

In yet another example, TLS security (e.g., TLS 1.2, 1.3) may be used to provide security and data integrity between a user device (e.g., 104, 108) and a server (e.g., 120). When secured by TLS, connections between a user (e.g. a web browser of device 104) and a server (e.g., 120) may have one or more of advantageous properties. The TLS connection may be private because symmetric cryptography is used to encrypt the data transmitted. The keys for this symmetric encryption are generated uniquely for each connection and are based on a secret negotiated at the start of a session (handshake protocol). The server (e.g., 120) and user (e.g., 104, 108) negotiate the details of which encryption algorithm and cryptographic keys to use before the first byte of data is transmitted. The negotiation of a shared secret is both secure, since the negotiated secret is unavailable to attackers, even those placed in the middle of the connection, and reliable, since no attacker can modify the communications during the negotiation without being detected. The identity of the communicating parties can be authenticated using public key cryptography.

It should be understood by those skilled in the art that the aforementioned examples are merely illustrative, and that other configurations utilizing public/private keys or public/private key associations are contemplated in the present disclosure. Other examples include Diffie-Hellman Protocol, Rivest-Shamir-Adleman (RSA), Domain Name System Security Extensions (DNSSEC) and the like. Additionally, aspects of certain examples may be used alone or in combination with other techniques provided in the examples and/or elsewhere herein.

Referring still to FIG. 5 a public key identifier (PKID) certificate may be generated at a user's device (e.g., 104, 108) and inserted into the IPv6 address 502 to securely identify a user device (e.g., 104, 108) communicating with a server (e.g., 102). In certain illustrative embodiments, the PKID 510 may be formed by a cryptographic hash function 518 (e.g., secure hash algorithm) of one or more of a device key 510, a user key 512, a DNS key 514 and a session ID key 516. The device key 510 may be a value or characteristic serving to identify the specific device (e.g., 104, 108). The user key 512 may be a value (e.g., used identification) and/or a characteristic (e.g., biometric data) serving to identify a specific user that may be linked to the device (e.g., 104, 108). The DNS key 514 may be a value identifying the location (address) of the server, and the session ID key 516 may be a value identifying a unique number that a web site's server assigns a specific user for the duration of that user's visit (session).

In certain illustrative embodiments, any or all of the keys 510-516 may be associated or linked to a user's private key 520. By linking the keys 510-516 to the private key 520, the resulting PKID 510 may serve as a "pointer" or "clue" for a server (e.g., 120) to determine a type of challenge to transmit to the device (e.g., 104, 108) for secure authentication. Accordingly, the disclosed configuration creates an IPv6 address that does not necessarily require cryptographic verification, but instead points to a certificate that may be used in subsequent connection attempts (e.g., after an initial registration) as a response. The server can quickly validate the address and with a reliable probability determine the public key it should use to challenge the client with. After a time-out or expiration of a session, the secure IPv6 address may be removed. Such configurations may advantageously provide a low-overhead authorization technique that may be efficiently deciphered.

In certain illustrative embodiments, the keys may be advantageously combined (e.g., device+user keys, device+DNS+session ID keys) to provide even more variation and security to the communications. When using a session ID key in certain illustrative embodiments, the server (e.g., 120) may require a pre-stored session database that would need to be hashed to effectively validate individual sessions and accurately determining which session should be referenced. In certain illustrative embodiments, the hash used in dynamically generated IPv6 addresses may be specific to a website and may also be specific to the session. It should be understood by those skilled in the art that, while the disclosure discusses the generation of IPv6 addresses on user devices (e.g., 104, 108), the IPv6 addresses may be alternately or additionally be generated in a server, node, or other device on the computer network (e.g., 118) coupled to the device (e.g., 104, 108) and the server (e.g., 102).

Exemplary Methods for Generating PKID Data for a User Device

FIG. 6 shows a process 600 for dynamically generating one or more IPv6 addresses (e.g., 500) containing a PKID (e.g., 520) from a user device (e.g., 104, 108), and communicating with a server (e.g., 120) on a network (e.g., 118), under an illustrative embodiment. Initially, a user device (e.g., 104, 108) registers with a server in block 602. During the registration, the user device (e.g., 104, 108) exchanges authentication data with the server and may share the PKID (e.g., 510) and hash (e.g., 518) with the server. In certain illustrative embodiments, this may be done by sharing a PKI certificate that includes the PKID (e.g., 510). Once registered, and prior to a subsequent connection with the server, the device (e.g., 104, 108) generates a public key identification comprising a PKID, where the PKID certification may be based any or all of the device key 606, user key 608, DNS key 610 and session ID key 612, to which the device (e.g., 104, 108) performs a hash function in block 614.

Once the PKID is obtained, the device (e.g., 104, 108) dynamically generates an additional IPv6 address for the server in block 616, wherein the IPv6 address contains the PKID generated in block 604. When the device (e.g., 104, 108) connects with the server, the server authenticates the device in block 618 using the PKID, where the server may use the public/private keys to determine and transmit a challenge, and receives in response from the device the public key of the server and private key for authentication. Once authenticated, the device (e.g., 104, 108) may securely communicate with the server in block 618. Once the device (e.g., 104, 108) has completed communicating with the server, or, when a session has expired, the dynamically generated IPv6 address may be discarded in block 622. Upon subsequent connections with the server, the process 600 may again dynamically generate a (new) IPv6 address in block 616 using the previously created PKID from block 604 and initiate a new secure session with the server in blocks 618-620. This process may be repeated as many times as necessary.

Exemplary Methods for Communicating with a User Device from a Server

FIG. 7 shows a process 700 for registering a user device at a server location and receiving and processing PKID data to determine challenge and authentication for the user device under an illustrative embodiment. In block 702 a server (e.g., 102) registers a device (e.g., 104, 108). Similar to the process 600 of FIG. 6, during the registration, the server (e.g., 120) receives authentication data from the user device (e.g., 104, 108) that may include the PKID (e.g., 510) and hash (e.g., 518). In certain illustrative embodiments, this may include a PKI certificate that includes the PKID (e.g., 510) and hash (e.g., 518). The received PKID for block 704 may be based on a hash of any or all of the device key 606, user key 608, DNS key 610 and session ID key 612. These may be received in a dynamically generated IPv6 address from the device (104, 108), containing the PKID. When the device (e.g., 104, 108) subsequently connects with the server (e.g., after registration), the server authenticates the device using the PKID, where the server may use the public/private keys to determine, in block 706, and transmit, in block 708, a challenge.

In block 710, the server receives a response to the challenge from the device that may include the public key of the server and private key for authentication. In decision block 712, the server determines if the device provided the correct response to the challenge. If an incorrect response was received ("NO"), the server denies access in block 714. If a correct response was received ("YES"), the server (e.g., 120) securely communicates with the device (e.g., 104, 108). As in the embodiment of FIG. 6, once the server (e.g., 102) has completed communicating with the device (e.g., 104, 108), or, when a session has expired, the dynamically generated IPv6 address may be discarded and the process may repeat with a new dynamically generated IPv6 address in block 704 using the stored PKID to initiate a new secure session with the device (e.g., 102, 104) in blocks 706-716. This process may be repeated as many times as necessary.

FIG. 8 shows another process 800 for registering a user device at a server location and receiving and processing PKID data to determine challenge and authentication for the user device under an illustrative embodiment. In block 802 a server (e.g., 102) receives an IP message from a device with a PKID in the source address, as discussed above. In decision block 804, the server determines if the PKID is in the server registration database. If not ("NO"), the server denies access to the device in block 806. If the server determines in decision block 804 that the PKID is in the registration database ("YES"), the process 800 moves to decision block 808, where the server determines if the routing prefix from the IP message is contained within the registration database. If not ("NO"), the server may register the routing prefix in block 810. In some illustrative embodiments, the server may limit the number or routing prefixes it will register before denying access. If the routing prefix is in a registration database in decision block 808 ("YES") the process determines a challenge to use for the device, based on the PKID in block 812.

After determining the challenge to use in block 812, the server transmits the determined challenge in block 814. In block 816, the server receives a response to the challenge from the device that may include the public key of the server and private key for authentication. In decision block 818, the server determines if the device provided the correct response to the challenge. If an incorrect response was received ("NO"), the server denies access in block 820. If a correct response was received ("YES"), the server (e.g., 120) securely communicates with the device (e.g., 104, 108) in block 822. Once the server (e.g., 102) has completed communicating with the device (e.g., 104, 108), or, when a session has expired, the dynamically generated IPv6 address may be discarded and the process may repeat with a new dynamically generated IPv6 address as discussed above.

Exemplary Device Configuration for Communicating with a Server

FIG. 9 is an exemplary embodiment of a computing device 900 (such as devices 104, 108 of FIG. 1), and may be a laptop, desktop, smart phone, tablet computer, and the like, configured to perform any of the features disclosed herein. The device 900 may include a central processing unit (CPU) 902 (which may include one or more computer readable storage mediums), a memory controller 904, one or more processors 906, a peripherals interface 908, communications circuitry 936, audio circuitry 938, a speaker 942, a microphone 944, and an input/output (I/O) subsystem 932 having display controller 924, control circuitry for one or more sensors 928 and input device control 932. These components may communicate over one or more communication buses or signal lines in device 900. It should be appreciated that device 900 is only one example of a portable multifunction device, and that device 900 may have more or fewer components than shown, may combine two or more components, or a may have a different configuration or arrangement of the components. The various components shown in FIG. 9 may be implemented in hardware or a combination of hardware and tangibly-embodies software, including one or more signal processing and/or application specific integrated circuits.

Memory (or storage) 910 may include high-speed random access memory (RAM) and may also include non-volatile memory, such as one or more magnetic disk storage devices, flash memory devices, or other non-volatile solid-state memory devices. Access to memory 910 by other components of the device 900, such as processor 906, and peripherals interface 908, may be controlled by the memory controller 904. Peripherals interface 908 couples the input and output peripherals of the device to the processor 906 and memory 910. The one or more processors 906 run or execute various software programs and/or sets of instructions stored in memory 910 to perform various functions for the device 900 and to process data. In some embodiments, the peripherals interface 908, processor(s) 906, decoder 918 and memory controller 904 may be implemented on a single chip, such as a chip 902. In other embodiments, they may be implemented on separate chips.

RF (radio frequency) circuitry 936 receives and sends RF signals, also known as electromagnetic signals. The communications circuitry 936 may include a wired or wireless communication interface and may convert electrical signals to/from electromagnetic signals and communicates with communications networks and other communications devices via the electromagnetic signals. The communications circuitry 936 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communications circuitry 936 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 938, speaker 942, and microphone 944 provide an audio interface between a user and the device 900. Audio circuitry 938 may receive audio data from the peripherals interface 908, converts the audio data to an electrical signal, and transmits the electrical signal to speaker 942. The speaker 942 converts the electrical signal to human-audible sound waves. Audio circuitry 938 also receives electrical signals converted by the microphone 944 from sound waves, which may include encoded audio, described above. The audio circuitry 938 converts the electrical signal to audio data and transmits the audio data to the peripherals interface 908 for processing. Audio data may be retrieved from and/or transmitted to memory 910 and/or the communications circuitry 936 by peripherals interface 908. In some embodiments, audio circuitry 938 also includes a headset jack for providing an interface between the audio circuitry 938 and removable audio input/output peripherals, such as output-only headphones or a headset with both output (e.g., a headphone for one or both ears) and input (e.g., a microphone).

I/O subsystem 932 couples input/output peripherals on the device 900, such as a touch screen 926 and other input/control devices, to the peripherals interface 908. The I/O subsystem 932 may include a display controller 924 and one or more input controllers 932 for other input or control devices. The one or more input controllers 932 receive/send electrical signals from/to other input or control devices 934. The other input/control devices 934 may include physical buttons (e.g., push buttons, rocker buttons, etc.), dials, slider switches, joysticks, click wheels, and so forth. In some alternate embodiments, input controller(s) 932 may be coupled to any (or none) of the following: a keyboard, infrared port, USB port, and a pointer device such as a mouse, an up/down button for volume control of the speaker 942 and/or the microphone 944. Touch screen 926 may also be used to implement virtual or soft buttons and one or more soft keyboards.

The touch screen 926 provides an input interface and an output interface between the device and a user. The display controller 924 receives and/or sends electrical signals from/ to the touch screen 926. The touch screen 926 displays visual output to the user. The visual output may include graphics, text, icons, video, and any combination thereof. In some embodiments, some or all of the visual output may correspond to user-interface objects. Touch screen 926 has a touch-sensitive surface, sensor or set of sensors that accepts input from the user based on haptic and/or tactile contact. Touch screen 926 and display controller 924 (along with any associated modules and/or sets of instructions in memory 910) detect contact (and any movement or breaking of the contact) on the touch screen 926 and converts the detected contact into interaction with user-interface objects (e.g., one or more soft keys, icons, web pages or images) that are displayed on the touch screen. In an exemplary embodiment, a point of contact between a touch screen 926 and the user corresponds to a finger of the user. Touch screen 926 may use LCD (liquid crystal display) technology, or LPD (light emitting polymer display) technology, although other display technologies may be used in other embodiments. Touch screen 926 and display controller 924 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 926.

Device 900 may also include one or more sensors 930 such as optical sensors that comprise charge-coupled device (CCD) or complementary metal-oxide semiconductor (CMOS) phototransistors. The optical sensor may capture still images or video, where the sensor is operated in conjunction with touch screen display 926. Device 900 may also include one or more accelerometers 940, which may be operatively coupled to peripherals interface 908. Alternately, the accelerometer 940 may be coupled to an input controller 932 in the I/O subsystem 932. The accelerometer 940 is preferably configured to output accelerometer data in the x, y, and z axes.

In some illustrative embodiments, the software components stored in memory 910 may include an operating system 912, a communication module 916, a text/graphics module 920, a Global Positioning System (GPS) module 914, decoder 918 and applications 922. Operating system 912 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 916 serves as a communication interface and facilitates wired and/or wireless communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.

Text/graphics module 920 includes various known software components for rendering and displaying graphics on the touch screen 926, including components for changing the intensity of graphics that are displayed. GPS module 914 determines the location of the device and provides this information for use in various applications. Applications 922 may include various modules, including mapping, address books/contact list, email, instant messaging, and the like.

Exemplary Server Configuration for Communicating with a Device

Referring now to FIG. 10, an illustrative embodiment of the system 100 of FIG. 1 is shown with further details of the server 120 communicatively coupled to user devices 104, 106 via network 118. In the embodiment illustrated in FIG. 10, the server 120 may be embodied as any type of computing device capable of performing the functions described herein. The server 120 may include a processor 1002, and I/O subsystem 1004, a memory 1006, data storage 1008, communication circuitry 1012, and one or more peripheral devices 1010. Of course, server 120 may include other or additional components, such as those commonly found in a digital apparatus and/or computer (e.g., various input/output devices), in other embodiments. Additionally, in some embodiments, one or more of the illustrative components may be incorporated in, or otherwise from a portion of, another component. For example, the memory 1006, or portions thereof, may be incorporated in the processor 1002 in some embodiments.

The processor 1002 may be embodied as any type of processor currently known or developed in the future and capable of performing the functions described herein. For example, processor 1002 may be embodied as a single or multi-core processor(s), digital signal processor, microcontroller, or other processor or processing/controlling circuit. Similarly, memory 1006 may be embodied as any type of volatile or non-volatile memory or data storage currently known or developed in the future and capable of performing the functions described herein. In operation, memory 1006 may store various data and software used during operation of the server 120 such as operating systems, applications, programs, libraries, and drivers.

The memory 1006 may be communicatively coupled to processor 1002 via I/O subsystem 1004, which may be embodied as circuitry and/or components to facilitate input/output operations with processor 1002, memory 1006, and other components of the server 120. For example, I/O subsystem 1004 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, I/O subsystem 1004 may form a portion of a system-on-a-chip (SoC) and be incorporated, along with the processor 1002, memory 1006, and other components of the server 120, on a single integrated circuit chip.

Communication circuitry 1012 of the server 120 may include any number of devices and circuitry for serving as a communications interface and enabling communications between the server 120 and one or more other external electronic devices and/or systems. Similarly, peripheral devices 1010 may include any number of additional input/output devices, interface devices, and/or other peripheral devices. Peripheral devices 1010 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

In some embodiments, memory 1006 and/or data storage 1008 has stored therein one or more application programs, and the processor 1002 is operable to execute the one or more application programs and control a display screen to display corresponding graphical information thereon. In some embodiments, system 100 may include the server 120 configured to store and/or execute the one or more application programs, and in such embodiments the server 120 may operate as a thin-client device. Although only one such server 120 is shown in FIGS. 1 and 10, it should be appreciated that, in other embodiments, system 100 may include any number of servers.

In the illustrated embodiment, network 118 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication may be configured to use any one or more, or combination, of communication protocols to communicate with each other such as, for example, a wired network communication protocol (e.g., TCP/IP), a wireless network communication protocol (e.g., Wi-Fi, WiMAX), a cellular communication protocol (e.g., Wideband Code Division Multiple Access (W-CDMA)), and/or other communication protocols. As such, the network 118 may include any number of additional devices, such as additional computers, routers, and switches, to facilitate communications between compute node 104 and controller node 114.

FIG. 11 shows a process for secure communication for a device by generating IP messages comprising identification data, IP messages being used to register the device and to respond to challenge data that is based at least in part on the identification data under sn illustrative embodiment. In block 1102, identification data is obtained in the device, wherein the identification data is configured as a hash of a public key for identifying at least one of the device and/or a user associated with the device. In block 1104, the device may generate an Internet Protocol (IP) message (e.g., IPv6) in the device, wherein an IP source address in the IPv6IP message comprises the identification data. In block 1106, the device may be registered by transmitting the IP message and the public key. In block 1108, the device may generate and transmit a second IP message (e.g., IPv6) after registering the device, wherein an IP source address of the second IPv6IP message comprises the identification data. In block 1110 the device may receive a challenge in response to the second IPv6IP message, wherein the challenge is based at least in part on the identification data. In block 1112, the device may transmit response data in response to the challenge for authenticating the device for secure network communication.

FIG. 12 shows a process for establishing secure communication with a device by receiving IP messages comprising identification data, wherein the IP messages are used to register the device and to provide challenge data that is based at least in part on the identification data under sn illustrative embodiment. In block 1202 a server may receive an IP message (e.g., IPv6), wherein the IP message comprises device identification data in an IP source address, the identification data comprising a hash of a public key for identifying at least one of the device and/or a user associated with the device. In block 1204 the server may register the device in response to receiving the IP message, and store a public key and routing prefix associated with the device. In block 1206, the server may receive a second IP message (e.g., IPv6) after registering the device, wherein the second IP message comprises the identification data in an IP source address. In block 1208, the server may select a challenge for the device in response to the second IP message, wherein the challenge is based at least in part on the identification data. In block 1210, the server may receive response data from the device in response to the challenge for authenticating the device for secure network communication.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other.

The various features of the disclosure described herein can be implemented in different systems without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for authenticating a device for secure network communication, comprising:
    obtaining identification data in the device, wherein the identification data is configured as a hash of a public key for identifying at least one of the device and/or a user associated with the device;
    generating an Internet Protocol (IP) message in the device, wherein an IP source address in the IP message comprises the identification data;
    registering the device by transmitting the IP message and the public key;
    generating and transmitting a second IP message after registering the device, wherein an IP source address of the second IP message comprises the identification data;
    receiving a challenge in the device in response to the second IP message, wherein the challenge is based at least in part on the identification data; and
    transmitting response data from the device in response to the challenge for authenticating the device for secure network communication.

2. The method of claim 1, wherein the identification data comprises at least one of a device key, a user key, a DNS key and/or a session ID key.

3. The method of claim 1, wherein obtaining the identification data in the device comprises inserting the identification data into an interface identifier field of the IP source address.

4. The method of claim 1, wherein generating the second IP message comprises generating a different IP source address from the first IP message.

5. The method of claim 1, wherein the hash comprises a secure hash algorithm.

6. The method of claim 1, wherein obtaining the identification data in the device comprises obtaining a hash of a server address to which at least one of the IP source address in the IP message and/or the IP source address of the second IP message is transmitted to.

7. The method of claim 1, wherein receiving the challenge in the device in response to the second IP message comprises receiving a public/private key challenge.

8. An apparatus for authenticating a device for network communication, comprising:
    a processor;
    a memory, operatively coupled to the processor; and
    a communication interface, operatively coupled to the processor and configured to communicate to a network,
    wherein the processor is configured to obtain identification data in the device, wherein the identification data is configured as a hash of a public key for identifying at least one of the device and/or a user associated with the device,
    wherein the processor is configured to generate an Internet Protocol (IP) message in the device, wherein an IP source address of the IP message comprises the identification data, and wherein the processor is configured to transmit the IP message and the public key to the communication interface for registering the device,
    the processor being further configured to generate and transmit, via the communication interface a second IP message after transmitting the IP message, wherein an IP source address of the second IP message comprises the identification data,
    the communication interface being configured to receive a challenge in response to the second IP message, wherein the challenge is based at least in part on the identification data, and
    wherein the processor is configured to transmit response data via the communication interface in response to the challenge for authenticating the device for secure network communication.

9. The apparatus of claim 8, wherein the identification data comprises at least one of a device key, a user key, a DNS key and/or a session ID key.

10. The apparatus of claim 8, wherein the processor is configured to insert the identification data into an interface identifier field of the IP source address to obtain the identification data.

11. The apparatus of claim 8, wherein the processor is configured to generate the second IP message that is different from the first IP message.

12. The apparatus of claim 8, wherein the hash comprises a secure hash algorithm.

13. The apparatus of claim 12, wherein the secure hash algorithm comprises a hash-based message authentication code (HMAC) having a secure hash algorithm (SHA), comprising one of HMAC-SHA1, HMAC-SHA2, HMAC-SHA3, HMAC-SHA-256, and MD5 message-digest (MD) algorithm.

14. The apparatus of claim 8, wherein the processor is configured to obtain identification data in the device by obtaining a hash of a server address to which at least one of the IP source address of the IP message and/or the IP source address of the second IP message is transmitted to.

15. The apparatus of claim 8, wherein the challenge comprises a public/private key challenge.

16. A method for authenticating a device for network communication, comprising:
    receiving an Internet Protocol (IP) message, wherein the IP message comprises device identification data in an IP source address, the identification data comprising a hash of a public key for identifying at least one of the device and/or a user associated with the device;
    registering the device in response to receiving the IP message, and storing a public key and routing prefix associated with the device;
    receiving a second IP message after registering the device, wherein the second IP message comprises the identification data in a second IP source address;
    selecting a challenge for the device in response to the second IP message, wherein the challenge is based at least in part on the identification data; and
    receiving response data from the device in response to the challenge for authenticating the device for secure network communication.

17. The method of claim 16, wherein the identification data comprises at least one of a device key, a user key, a DNS key and/or a session ID key.

18. The method of claim 16, wherein the identification data comprises identification data inserted into an interface identifier field of the IP source address.

19. The method of claim 16, wherein receiving the second IP message comprises receiving a different IP source address from the first IP message.

20. The method of claim 16, wherein the hash comprises a secure hash algorithm.

21. The method of claim 16, wherein the identification data comprises a hash of a server address to which at least one of the IP source address and/or second IP source address.

22. The method of claim 16, wherein selecting the challenge in the device in response to the second IP message comprises selecting a public/private key challenge.

23. The method of claim 16, further comprising rejecting the device for secure communication if the IP source address for the second IP message does not match the IP source address for the first IP message.

24. The method of claim 23, further comprising rejecting the device for secure communication if a routing prefix for the second IP message does not match the routing prefix for the first IP message.

25. A non-transitory machine readable storage medium having stored thereon a computer program for authenticating a device for network communication, the computer program comprising a routine of set instructions for causing the machine to perform the steps of:
    obtaining identification data in the device, wherein the identification data is configured as a hash of a public key for identifying at least one of the device and/or a user associated with the device;
    generating an Internet Protocol (IP) message in the device, wherein the IP message comprises the identification data;
    registering the device by transmitting the IP message;
    generating and transmitting a second IP message after registering the device, wherein the second IP message comprises the identification data;
    receiving a challenge in the device in response to the second IP message, wherein the challenge is based at least in part on the identification data; and
    transmitting response data from the device in response to the challenge for authenticating the device for network communication.

26. The non-transitory machine readable storage medium of claim 25, wherein the identification data comprises at least one of a device key, a user key, a DNS key and/or a session ID key.

27. The non-transitory machine readable storage medium of claim 25, wherein obtaining the identification data in the device comprises inserting the identification data into an interface identifier field of an IP address.

28. The non-transitory machine readable storage medium of claim 25, wherein the hash comprises a secure hash algorithm.

* * * * *